(12) United States Patent
Inoue et al.

(10) Patent No.: US 6,872,485 B2
(45) Date of Patent: Mar. 29, 2005

(54) SEALING STRUCTURE FOR FUEL CELL

(75) Inventors: Masajirou Inoue, Wako (JP); Nobuaki Kimura, Wako (JP); Makoto Tsuji, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 5 days.

(21) Appl. No.: 09/906,004

(22) Filed: Jul. 17, 2001

(65) Prior Publication Data

US 2002/0055027 A1 May 9, 2002

(30) Foreign Application Priority Data

Jul. 25, 2000 (JP) ........................................ 2000-223342

(51) Int. Cl.[7] ................................................ H01M 2/00

(52) U.S. Cl. ................................ 429/34; 429/34; 429/30

(58) Field of Search .............................. 429/34, 35, 36, 429/30, 33; 49/484.1, 489.1, 499.1, 95

(56) References Cited

U.S. PATENT DOCUMENTS

| | | | | |
|---|---|---|---|---|
| 6,057,054 A | * | 5/2000 | Barton et al. | 429/42 |
| 6,080,503 A | * | 6/2000 | Schmid et al. | 429/35 |
| 6,242,124 B1 | * | 6/2001 | Saito et al. | 429/38 |
| 6,348,279 B1 | * | 2/2002 | Saito et al. | 429/34 |

\* cited by examiner

*Primary Examiner*—Raymond Alejandro
(74) *Attorney, Agent, or Firm*—Arent Fox PLLC

(57) ABSTRACT

A sealing structure in a fuel cell comprises a pair of separators including gas passages and a membrane electrode assembly held by the pair of separators and having a polymerized electrolytic membrane and a electrode layer so as to form a fuel cell. The sealing structure seals a sealing portion between the pair of the separators and the polymerized electrolytic membrane. A sealing groove is provided to the sealing portion of one of the separators, and a first seal has a thickness greater than the depth of the sealing groove and a portion which is gradually narrowed toward an end thereof. A protrusion is provided to the sealing portion of the other separator, and a second seal having a constant width is provided to the front surface of the protrusion. The polymerized electrolytic membrane is held by the first seal and the second seal.

7 Claims, 5 Drawing Sheets

SEALING STRUCTURE FOR FUEL CELL

BACKGROUND OF THE INVENTION

1. Technical Field

The present invention relates to gas sealing structures for solid polymer electrolyte fuel cells.

2. Related Art

In solid polymer electrolyte fuel cells, a separator is layered on both sides of a plate-shaped membrane electrode assembly to form a unit of the layered structure, and the plural units are layered to form a fuel cell stack. The membrane electrode assembly is a layered structure, in which a polymerized electrolytic membrane is held by a positive catalytic electrode (cathode electrode plate) and a negative catalytic electrode (anode electrode plate), and a gas diffusion layer is layered on the outer surface of each catalytic electrode. The separator is made from a material having electron transmitting characteristics, and has plural grooved gas passages in which a fuel gas such as hydrogen gas, an oxidizing gas such as oxygen or air, and a coolant flow individually. The separator is layered on the membrane electrode assembly such that linear protrusions between the gas passages are contacted with the gas diffusion layer.

According to the fuel cell, a fuel gas is provided to the gas passage of the separator at the negative electrode side, and an oxidizing gas is provided to the gas passage of the separator at the positive electrode side, whereby electricity is generated by electrochemical reaction. During the operation of the fuel cell, the gas diffusion layers transmit the electrons generated by the electrochemical reaction between the catalytic electrode layers and the separators, and diffuse the fuel gas and the oxidizing gas. The catalytic electrode layer in the negative electrode side results in a chemical reaction for the fuel gas so as to generate protons and electrons. The catalytic electrode layer in the positive electrode side generates water from oxygen, the proton, and the electron, and the polymerized electrolytic membrane facilitates ionic migration for the proton, whereby electrical power is provided via the positive and negative catalytic electrode layer.

In the above-described fuel cell, the fuel gas, the oxidizing gas, and the coolant must be flowed in individual gas passages, so that the gas passages are separated from each other by a seal. The sealing portion varies according to the structure of the fuel cell stack. For example, a seal is provided around a communicating opening of the gas passages penetrating the fuel cell stack, around the membrane electrode assembly, around a coolant passage provided on the outer surface of the separator, and around the circumference of the outer surface of the separator.

According to conventional sealing technology, in general, an elastic material made from an organic rubber of the fluorine type, silicone type, ethylene propylene type, or the like, is formed into a shape of a sheet or an O-ring, and is mounted to a sealing portion. The sealing member seals the sealing portion by a reaction force generated by being compressed in a stacked condition. As other sealing structures, a seal in which an inorganic material formed of carbon or ceramic is compressed, and a mechanical seal using caulking, adhering, and the like have been provided.

Fuel cells are often carried or installed in automobiles for use. In these cases, the cells are stringently required to be small and thin. In particular, it has been desired how separators are realized in a structure as thin as possible. Materials of a type, such as baked carbon, which is easily broken by bending, and of a type, such as expanded carbon and metals, which is flexible to a certain extent in bending are known. When the separator made from the materials of the former type is used in assembling a fuel cell stack by stacking plural membrane electrode assemblies, the position of the sealing portion varies due to the variation in the thickness of the membrane electrode assembly and the variation of the size of the separator. As a result, the stresses in the sealing portions differ from each other, and breakage in the separator readily occurs. Therefore, a liquid seal is coated on the separator, and it is cured after stacking the membrane electrode assemblies. In contrast, the separator made from the materials of the later type has flexibility, so that even if a difference in the stresses in the sealing portion occurs, the difference is partially absorbed by the separator, whereby general solid seals may be applied.

In the liquid seal, the steps comprising coating on the separator through curing after stacking the membrane electrode assemblies require complicated control of the viscosity of the liquid seal and degassing therefrom for coating accuracy, and complicated setting of the environmental temperature and the conditions of the coating machine are necessary. In particular, since the viscosity of the liquid seal must be high to maintain the shape of the coating, a long time is required for the coating to obtain accuracy thereof. Furthermore, a large amount of care is required in traveling and stacking the separators in order not to damage the shape of the liquid seal after coating. Thus, the liquid seals have disadvantages in manufacturing efficiency.

In contrast, in the solid seals, the difference between stresses in the sealing portion can be facilitated by reducing the variations of the thickness of the membrane electrode assembly and the size of the separator, so that the desired sealing characteristics can be obtained. However, in this case, the yield of the membrane electrode assembly and the separator decrease, and the manufacturing efficiency decreases.

SUMMARY OF THE INVENTION

Therefore, an object of the present invention is to provide a seal structure for a fuel cell, in which the stress in the seals facing each other is dispersed and the surface pressure thereof can be uniform even if the thickness of the membrane electrode assembly and the size of the separator vary, whereby good sealing characteristics can be obtained, and the manufacturing efficiency can be improved.

The present invention provides a sealing structure in a fuel cell comprising: a pair of separators including gas passages; a membrane electrode assembly held by the pair of separators and having a polymerized electrolytic membrane and an electrode layer so as to form a fuel cell; wherein the sealing structure seals a sealing portion between the pair of the separators and the polymerized electrolytic membrane; a sealing groove is provided to the sealing portion of one of the separators, and a first seal has a thickness greater than the depth of the sealing groove and a portion which is gradually narrowed toward an end thereof; a protrusion is provided to the sealing portion of the other separator, and a second seal having a constant width is provided to the front surface of the protrusion; and the polymerized electrolytic membrane is held by the first seal and the second seal.

According to the invention, the first seal and the second seal oppose each other holding the electrolytic membrane therebetween, closely contacting with the electrolytic membrane compressing each other with the pressure corresponding to the stacking pressure, and sealing the gas passages of the separator. Since the end portion of the first seal is gradually narrowed, even if the positions of the seals are misaligned each other due to variations in the size of the separator, the sealing surface on the end surface of the first seal is not separated from the width of the second seal, and a constant sealing area is obtained, whereby the surface pressure between the seals can be uniform. Therefore, the sealing characteristics can be ensured independently of the variation of the thickness of the membrane electrode assembly and the size of the separator.

With respect to the function of the first and second seals, when the first and second seals are compressed with each other holding the electrolytic membrane therebetween, the narrowed end portion of the first seal intrudes into the second seal. In this condition, the second seal functions to disperse the stress, so that the surface pressure in the second seal is readily lower than that of the first seal. In the invention, since the thickness of the second seal is thin and the elastic deformation thereof is inhibited, the dispersion of the surface pressure in the second seal is intensively inhibited. The second seal is readily set as the lateral cross section thereof is small since the percentage of the cross section with respect to the sealing area decreases. In the invention, in order not to severely decrease the cross section and to reduce the contacting area with the electrolytic membrane, the end portion of the first seal is narrowed. Since the end portion of the first seal is narrowed and the second seal opposing thereto is a thin sheet, the surface pressure in the seals closely contacting with the electrolytic membrane can be uniform. Furthermore, when the second seal with a small thickness is set, the setting ratio with respect to the entire thickness of the seals is small, whereby the thickness of the setting can be compensated by the reaction force of the first seal.

The first and second seal should be closely contacted with the electrolytic membrane with good balance so as not to tilt the electrolytic membrane. If the height of one of the seals is too great, the electrolytic membrane will be pushed by the seal and will tilt. In particular, if the electrode layer is rectangular, the electrolytic membrane exactly contacts with the corner of the electrode layer, whereby the electrolytic membrane is easily broken by repeated expansion and contraction thereof in the cooling and heating cycle. In order to avoid such a problem, the height of the seals is limited so as not to tilt the electrolytic membrane when the seals hold and seal it.

Preferable materials for the separator and the seal will be explained hereinafter.

The separator is preferably made from a metal, a composite material of a metal and carbon, or a composite material of a resin and carbon. The first and second seal are preferably made from a rubber, a resin, or a composite material of a rubber and a resin. An organic rubber of the fluorine type, silicone type, ethylene propylene type, or the like, is used as the rubbers.

When the separator is made from a metal or a composite material of a metal and carbon, flexibility is obtained thereby and breakage thereof can be inhibited. In forming the separators, the sealing grooves may be formed on the front surface thereof, and the protrusions (preferably linear protrusions) may be simultaneously formed on the reverse surface corresponding to the sealing grooves by press forming. According to the forming method, the first seal may be provided to the sealing groove and the second seal may be provided to the opposite protrusion. By stacking the first seal and the second seal alternatingly, misalignment of the position of the sealing portion does not easily occur and the sealing portion can be reliably sealed. Moreover, the securing portions for the first and second seals can be formed simultaneously, whereby manufacturing efficiency can be improved.

Flexibility also can be obtained by forming the separators from a composite material of a resin and carbon. Expanded carbon is preferable as the carbon. The expanded carbon is provided with flexibility by refining natural carbon as a raw material and subjecting it to an acid treatment, and then expanding it in the direction of the C axis (direction along the distance between the hexagonal faces of the carbon crystal). The deformation of the expanded carbon with respect to load is large, and the expanded carbon is used for gaskets in engines. Resins such as phenol may be impregnated into pores in the expanded carbon. When the separators are formed from such a composite material, high airtightness can be obtained in addition to flexibility, whereby gas diffusion properties which are naturally included in separators and electron transmitting characteristics are improved, and sealing performance at the connection portion between the separators can be improved.

In order to provide the first and second seals to the separator, each seal and the separator are individually formed, and the seals are clamped between the separators in assembly, or seals are adhered to the separator. Alternatively, the separator may be set in a mold, and the material for the seal may be injected into a cavity of the mold so as to integrally form the seal with the separator. In such an injection molding, the producing efficiency can be improved, and the handling in assembly can be facilitated.

DETAILED DESCRIPTION OF THE INVENTION

Figure 1:
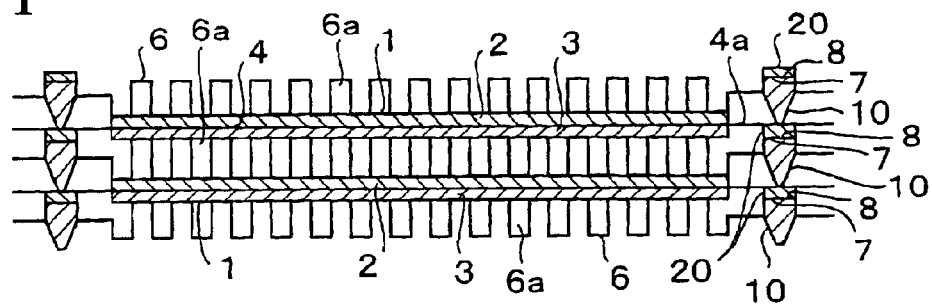
FIG. 1 is a cross section of a fuel cell to which a sealing structure of a first embodiment of the invention is applied.

An embodiment of the invention will be explained hereinafter with reference to the figures.

FIGS. 1 through 7 show stacked conditions in a fuel cell stack according to first through seventh embodiments of the invention. In the figures, reference numeral 1 indicates a membrane electrode assembly having a rectangular shape in the plane view, and numeral 6 indicates a separator having gas passages 6a. The membrane electrode assembly is a three-layered structure in which an electrolytic membrane 4 formed from an ion-exchange resin, and the like, is held by a pair of gas diffusion electrode plates 2 and 3 which are a positive electrode and a negative electrode respectively. The center electrolytic membrane 4 in the membrane electrode assembly 1 has a larger area than that of each gas diffusion electrode plate 2 or 3, and the circumference 4a thereof projects from them. The circumference 4a and each separator 6 are sealed.

Figure 6:
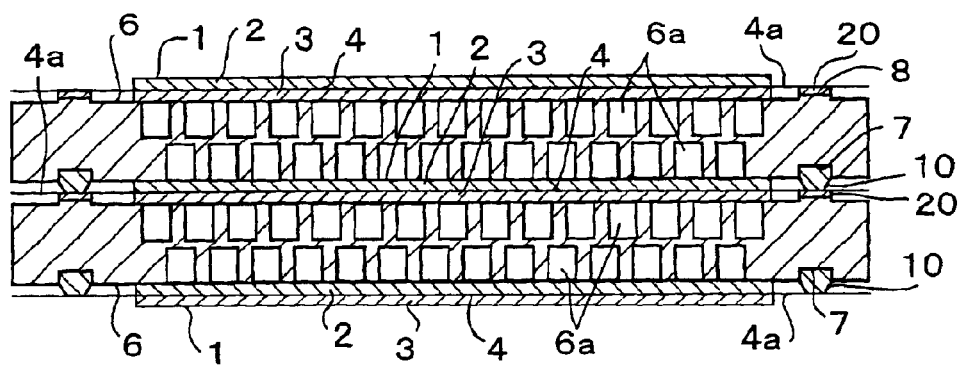
FIG. 6 is a cross section of a fuel cell to which a sealing structure of a sixth embodiment of the invention is applied.
Figure 7:
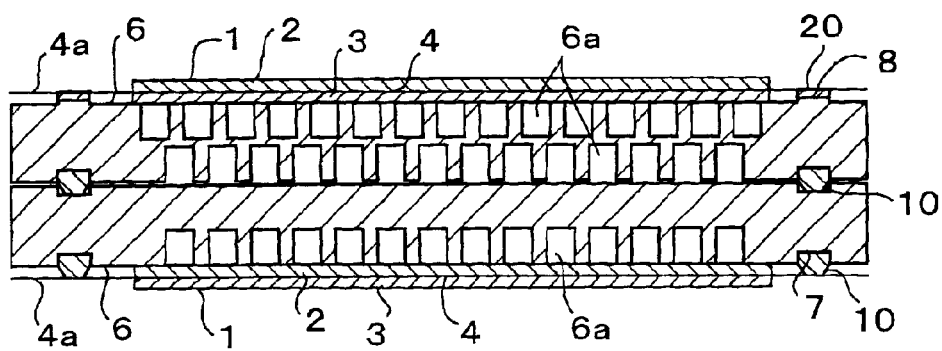
FIG. 7 is a cross section of a fuel cell to which a sealing structure of a seventh embodiment of the invention is applied.

The separators 6 shown in FIGS. 1 to 5 are formed by press forming a metallic plate made from stainless steel or aluminum alloy into a corrugated plate, and the grooves formed on both surfaces thereof are applied for the gas passages 6a. In the case of FIG. 1, one separator 6 is stacked on both surfaces of the membrane electrode assembly 1 in the condition in which the corrugations of the plates coincide with each other. In the case of FIGS. 2 to 5, the corrugations of the plates of the separators 6 on the opposite sides of the membrane electrode assembly 1 coincide with each other, and the corrugations of the plates of the separators 6 contacting with each other are the converse of each other. The separators 6 in FIGS. 6 and 7 are formed from expanded carbon and have gas passages 6a formed by grooves.

In the circumference of the separators 6 in FIGS. 1 to 5, a sealing groove 7 and a linear protrusion 8 are integrally formed on both surfaces thereof. The sealing groove 7 and the linear protrusion 8 oppose each other holding the circumference 4a of the electrolytic membrane 4 therebetween. In the circumference of the separators in FIGS. 6 and 7, a sealing groove 7 and a linear protrusion 8 are integrally formed on both surfaces thereof. A first seal 10 is provided to each sealing groove 7, and a second seal 20 is provided to the linear protrusion 8.

Figure 2:
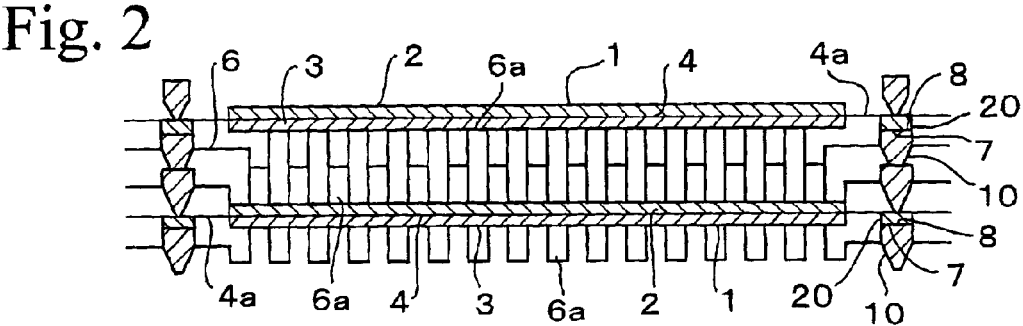
FIG. 2 is a cross section of a fuel cell to which a sealing structure of a second embodiment of the invention is applied.
Figure 3:
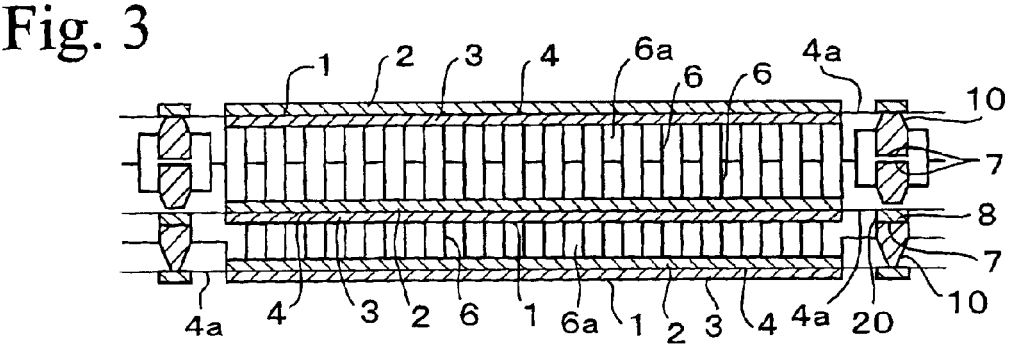
FIG. 3 is a cross section of a fuel cell to which a sealing structure of a third embodiment of the invention is applied.
Figure 4:
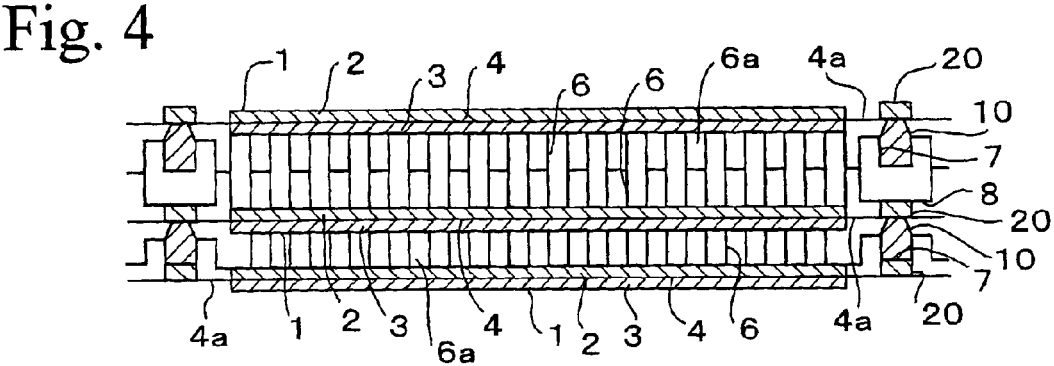
FIG. 4 is a cross section of a fuel cell to which a sealing structure of a fourth embodiment of the invention is applied.
Figure 5:
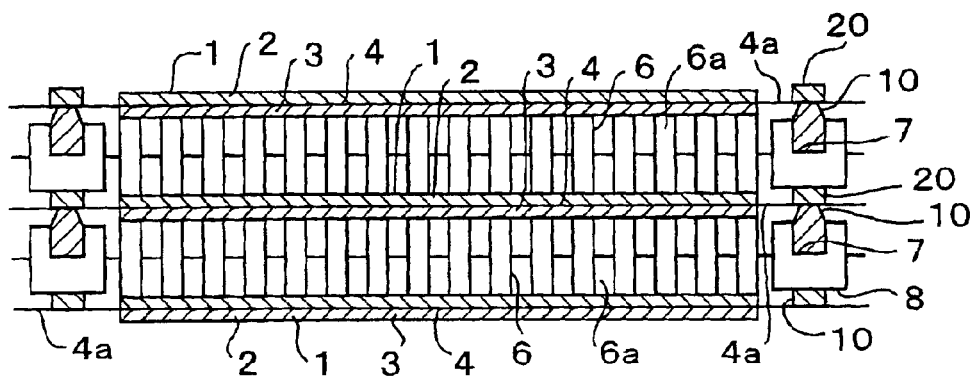
FIG. 5 is a cross section of a fuel cell to which a sealing structure of a fifth embodiment of the invention is applied.
Figure 8:
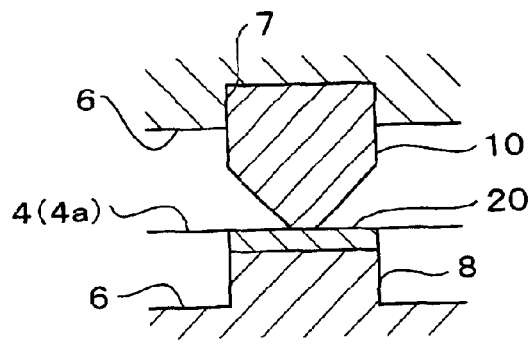
FIG. 8 is a cross section of a sealing structure showing a concept of the invention.
Figure 9A:
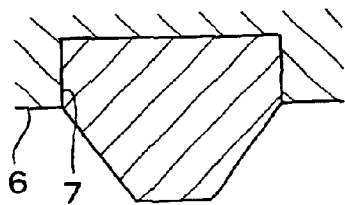
FIGS. 9A to 9F a re cross sections showing arrangements of a second seal according to the invention.
Figure 9B:
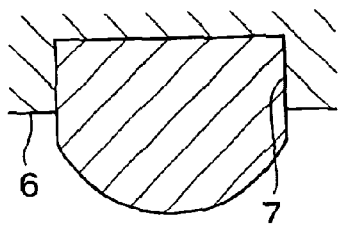
Figure 9C:
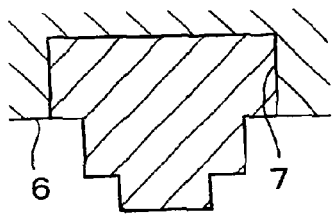
Figure 9D:
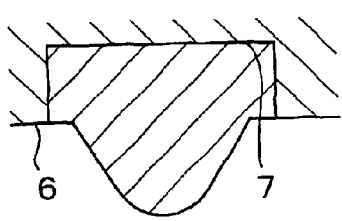
Figure 9E:
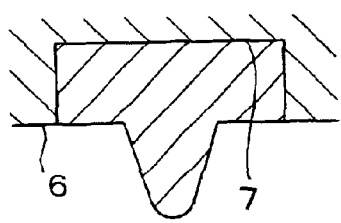
Figure 9F:
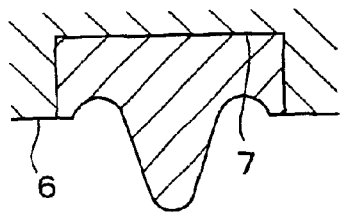

The design in which the gas passage 6a is sealed by the first seal 10 and the second seal 20 is the same in the cases of FIGS. 1 to 7, and the design is explained with reference to FIG. 8. As shown in the figure, the first seal 10 provided to the sealing groove 7 is embedded into the sealing groove 7. The thickness of the first seal 10 is greater than the depth of the sealing groove 7. The end portion of the first seal 10 is tapered like a trapezoid and narrows in width. The second seal 20 is a sheet with a uniform thickness, and is provided on the front surface of the linear protrusion 8. These seals 10 and 20 are formed from an organic rubber, and they are integrally formed with the separator 6 by, for example, injection molding. In FIGS. 2 and 7, the sealing portion between separators 6 is sealed by the first seal 10.

According to the sealing structure including the first seal 10 and the second seal 20, the seals 10 and 20 oppose each other holding the electrolytic membrane 4 therebetween, closely contact with the electrolytic membrane 4 compressing each other with the pressure corresponding to the stacking pressure when a fuel cell stack is assembled, and seal the gas passages 6a of the separator 6. When the first seal 10 and the second seal 20 are compressed holding the electrolytic membrane 4 therebetween, the narrowed end portion of the first seal 10 intrudes into the second seal 20. In this condition, since the thickness of the second seal 20 is thin and the elastic deformation thereof is inhibited, the dispersion of the surface pressure on the second seal 20 is strongly inhibited. Since the end portion of the first seal 10 is narrowed, and the sealing area which closely contacts with the electrolytic membrane 4 is small, the second seal 20 is not easily set. Thus, the end portion of the first seal 10 is narrowed and the second seal 20 opposing thereto is a thin sheet, whereby the surface pressures of both closely contacting with the electrolytic membrane 4 can be uniform. When the second seal 20 with a small thickness is set, the setting ratio with respect to the entire thickness of the seals 10 and 20 is small, whereby the thickness of the setting can be compensated by the reaction force of the first seal 10.

According to the above-mentioned functions, even if the positions of the seals 10 and 20 are misaligned with each other due to the variation of the size of the separator 6, the sealing surface on the end surface of the first seal 10 is not separated from the width of the second seal 20 and the constant sealing area is obtained, whereby the surface pressure between the seals 10 and 20 can be uniform. Therefore, the sealing characteristics can be ensured independently of the variation of thickness of the membrane electrode assembly 1 and the size of the separator 6.

The design of the seal 10 is an embodiment, and cross sections according to arrangements thereof, in which an end portion is narrowed, are exemplified in FIGS. 9A to 9F. In the seal in FIG. 9A, the entire portion projecting from the sealing groove 7 has a trapezoidal cross section. The seal in FIG. 9B has an ellipsoidal end portion, and the seal in FIG. 9C has a stepped end portion. The seal in FIG. 9D has an end portion in the shape of a triangular rib, and the seals in FIGS. 9E and 9F have an end portion in the shape of a thin rib. In the first seal 10, the reaction force can be adjusted in compression according to the cross section of the end portion thereof even if the height and the width of the seal 10 are constant.

EXAMPLE

The advantages of the invention will be confirmed by an example of the invention.

Example of the Invention

Figure 10:
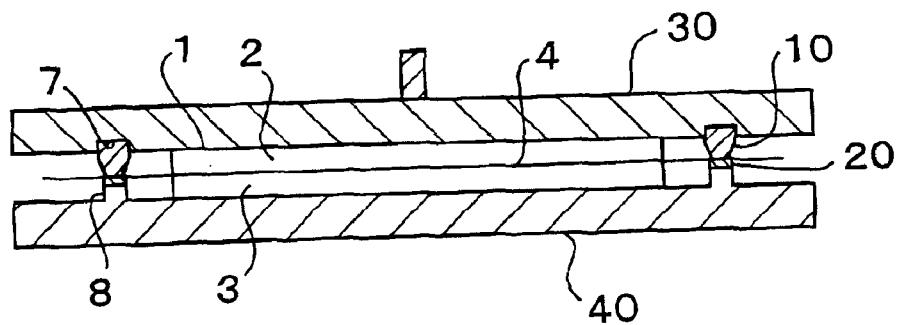
FIG. 10 is a cross section showing a gas leakage test in an example.

As shown in FIG. 10, a electrolytic membrane 4 was held by a pair of gas diffusion electrodes 2 and 3 so as to form a membrane electrode assembly 1, which was held by an upper jig 30 and a lower jig 40 which correspond to a separator. A sealing groove 7 and a linear protrusion 8 were formed on the opposing surfaces of the upper and lower jigs 30 and 40. Seals 10 and 20 were mounted to the upper and lower jigs 30 and 40, and were opposed to each other holding the electrolytic membrane 4 therebetween. The upper and lower jigs 30 and 40 were clamped to each other by a clamping jig (not shown), whereby the upper and lower seal 10 and 20 were closely contacted with the electrolytic membrane 4 so as to seal it. In this condition, helium gas was charged through a pressure hole formed at the center of the upper jig 30, and the amount of gas leakage from the sealing portion per hour was measured. The specifications of the upper and lower jigs 30 and 40, the gas diffusion electrodes 2 and 3, the electrolytic membrane 4, and the seal 10 and 20, and conditions in the test are described below.

Upper Jig 30
  Material: SUS316
  Dimensions: 90×90×5 (mm)
  Dimensions of the Sealing Groove 7: W×D×L=2×0.3×256 (mm)
Lower Jig 40
  Material: SUS316
  Dimensions: 90×90×5 (mm)
  Dimensions of the Linear Protrusion 8: Width×Depth×Length=2×0.5×256 (mm)
Gas Diffusion Electrodes 2 and 3
  Material: Carbon Cloth with Pt/C Catalyst
  Dimensions: 60×60×0.5 (mm)
Electrolytic Membrane 4
  Material: Perfluorosulfonic Acid Polymer
Upper seal 10
  Material: Silicone (Hardness: 50°)
  Dimensions of Sealing Groove 7:
    Height×Length=0.92×256 (mm)
    Width: 2 mm from bottom of the sealing groove 7 to 0.52 mm height, 1 mm at the end surface
Lower Seal 20
  Material: Silicone (Hardness: 50°)
  Dimensions: Width×Height×Length=2×0.125×256 (mm)
Clamping Force by the Upper and Lower Jigs 30 and 40: 1 N/mm
Supply Pressure of Helium Gas: 200 kPa

Comparative Example 1

Figure 11:
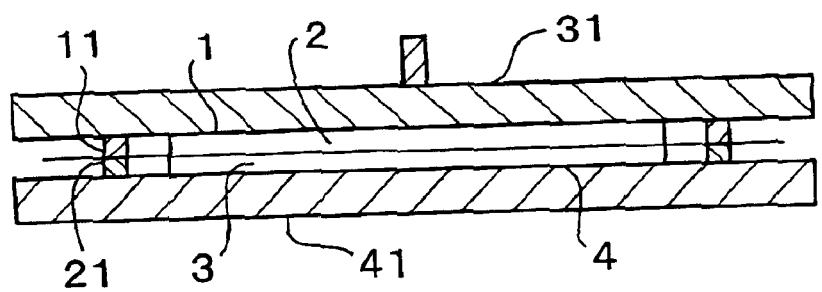
FIG. 11 is a cross section showing a gas leakage test in comparative example 1.

As shown in FIG. 11, a gas leakage test under the same conditions as the example, except that upper and lower jigs 31 and 41 of which opposing surfaces are planar and upper and lower seals 11 and 21 with a square cross section were used, was performed. The specifications of the upper and lower seals 11 and 21 are described below.
Upper and Lower seals 11 and 21
  Material: Silicone (Hardness: 50°)
  Dimensions: Width×Height×Length=2×0.625×256 (mm)

Comparative Example 2

A gas leakage test under the same conditions as comparative example 1, except for the following condition, was performed.

Figure 12:
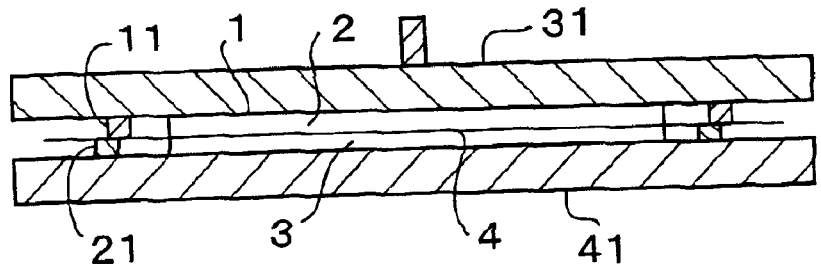
FIG. 12 is a cross section showing a gas leakage test in comparative example 2.

The maximum positioning tolerance in the lateral direction in the seals 11 and 21 in comparative example 1 was 0.5 mm in the X axis and the Y axis directions respectively. That is, the maximum misalignment in the upper and lower seals 11 and 21 was assumed to be 1 mm. As shown in FIG. 12, the sealing portion in comparative example 1 was offset under the above misalignment, so that the width of the sealing portion between the upper and lower seals 11 and 21 was 1 mm along the entire length thereof (2 mm in comparative example 1).

Comparative Example 3

Figure 13:
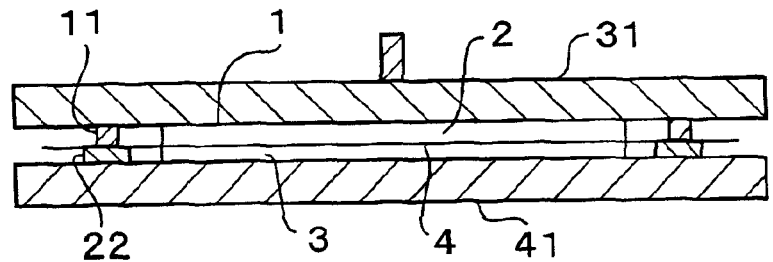
FIG. 13 is a cross section showing a gas leakage test in comparative example 3.

A gas leakage test under the same conditions as comparative example 1, except that the width of the lower seal 22 was 4 mm, was performed (see FIG. 13).

Comparative Example 4

Figure 14:
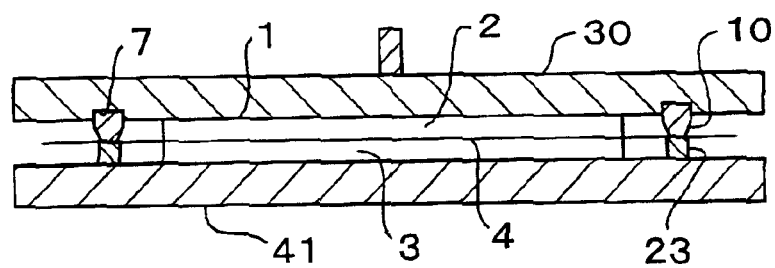
FIG. 14 is a cross section showing a gas leakage test in comparative example 4.

A gas leakage test under the same conditions as the example of the invention, except that the lower jig 41 in comparative example 1 was used and the height of the lower seal 23 was 0.925 mm, was performed (see FIG. 14).

Comparative Example 5

Figure 15:
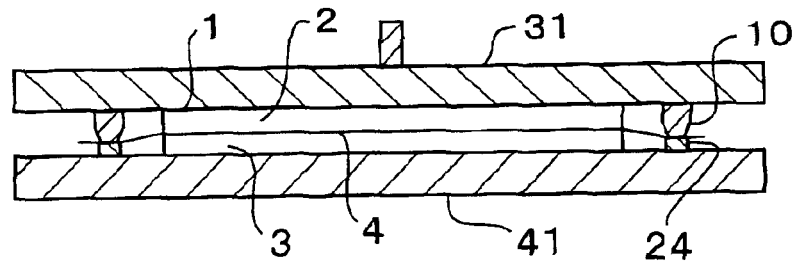
FIG. 15 is a cross section showing a gas leakage test in comparative example 5.

A gas leakage test under the same conditions as the comparative example 4, except for the following conditions, was performed (see FIG. 15).

The upper and lower jigs 31 and 41 in comparative example 1 were used and the seal 10, similar to the example of the invention, was mounted to the upper jig 31. The height of the lower seal 24 was 0.925 mm.

The gas leakage tests were performed in three conditions: an initial condition in which the environmental temperature for measurement was in the range of 20 to 24° C., a cooling and heating cycle in which the sample was maintained at the environmental temperature for measurement of −40° C. for an hour and the sample was maintained at the environmental temperature for measurement of 90° C. for an hour, and a high temperature endurance test in which the environmental temperature for measurement was 90° C. The results of the tests are shown in Table 1.

As is clearly seen from Table 1, in the example of the invention, gas leakage did not occur, and this demonstrates that there was no problem in sealing characteristics. In contrast, in the comparative examples, gas leakage appeared in at least the cooling and heating cycle and in the high temperature endurance test, and they exhibited problems in sealing characteristics.

| | Initial Condition | Cooling and Heating Cycle (−40° C./1 hr~ 90° C./1 hr) | High Temperature Endurance (90° C.) | Analysis of Test |
|---|---|---|---|---|
| Example | 0 cc/min | 0 cc/min (1000 cycle) | 0 cc/min (1500 hr) | — |
| Comparative Example 1 | 0 cc/min | 0 cc/min (1000 cycle) | 0.5 cc/min (1250 hr) | Setting in Seal in High Temperature Endurance |
| Comparative Example 2 | 0 cc/min | 0.5 cc/min (1000 cycle) | 0 cc/min (1000 hr) | Signs of Lateral Movement of Upper and Lower Seal |
| Comparative Example 3 | 0 cc/min | 0.3 cc/min (750 cycle) | 0.3 cc/min (1000 hr) | Leakage in Lower Seal Side |
| Comparative Example 4 | 0 cc/min | 0 cc/min (1000 cycle) | 0.5 cc/min (1000 hr) | Leakage in Lower Seal Side |
| Comparative Example 5 | 0 cc/min | 3 cc/min (1000 cycle) | 0 cc/min (1000 hr) | Breakage in Electolytic Membrane at Edge of Diffusion Electrode |

What is claimed is:

1. A sealing structure for a fuel cell comprising:
   a pair of separators including gas passages;
   a membrane electrode assembly held by the pair of separators and having a polymerized electrolytic membrane and an electrode layer so as to form a fuel cell;
   wherein the sealing structure seals a sealing portion between the pair of the separators and the polymerized electrolytic membrane;
   a sealing groove is provided to the sealing portion of one of the separators, and a first seal has a thickness greater than the depth of the sealing groove and the first seal having a first end disposed in the sealing groove and having a first width, and a second end distal from the sealing groove and having a second width that is narrower than the first width, wherein a portion of the first seal is gradually narrowed toward the second end;

a protrusion is provided to the sealing portion of the other separator, and a second seal having constant width is provided to the front surface of the protrusion; and the polymerized electrolytic membrane is held by the first and second seal.

2. A sealing structure for a fuel cell according to claim 1, wherein the separator is made from a metal or a composite material of a metal and carbon, the first and second seal are made from a rubber, a resin, or a composite material of a rubber and a resin.

3. A sealing structure for a fuel cell according to claim 1, wherein the separator is made from a composite material of a resin and carbon, and the first and second seal are made from a rubber, a resin, or a composite material of a rubber and a resin.

4. A sealing structure for a fuel cell according to claim 2, wherein the separator is corrugated plate formed by press forming from a metallic plate.

5. A sealing structure for a fuel cell according to claim 3, wherein the separator is formed from expanded carbon having pores, which are filled with resin.

6. A sealing structured for a fuel cell according to claim 1, wherein at least one of the first seal and the second seal is integrally formed with the separator by an injection molding method.

7. A sealing structure for a fuel cell according to claim 1, wherein at least one of the first seal and the second seal is adhered to the separator.

* * * * *